(12) United States Patent
Lazur

(10) Patent No.: US 9,726,025 B2
(45) Date of Patent: Aug. 8, 2017

(54) CERAMIC MATRIX COMPOSITE

(71) Applicant: Rolls-Royce Corporation, Indianapolis, IN (US)

(72) Inventor: Andrew Joseph Lazur, Huntington Beach, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 672 days.

(21) Appl. No.: 14/097,857

(22) Filed: Dec. 5, 2013

(65) Prior Publication Data

US 2014/0271161 A1  Sep. 18, 2014

Related U.S. Application Data

(60) Provisional application No. 61/786,304, filed on Mar. 15, 2013.

(51) Int. Cl.

| F01D 5/28 | (2006.01) |
|---|---|
| F01D 5/14 | (2006.01) |
| F01D 9/02 | (2006.01) |
| C04B 35/565 | (2006.01) |
| C04B 35/573 | (2006.01) |
| C04B 35/628 | (2006.01) |
| C04B 35/80 | (2006.01) |

(52) U.S. Cl.
CPC ............ *F01D 5/282* (2013.01); *C04B 35/565* (2013.01); *C04B 35/573* (2013.01); *C04B 35/62868* (2013.01); *C04B 35/806* (2013.01); *F01D 5/14* (2013.01); *F01D 9/02* (2013.01); C04B 2235/5224 (2013.01); C04B 2235/5244 (2013.01); C04B 2235/5252 (2013.01); C04B 2235/5256 (2013.01); C04B 2235/5264 (2013.01); C04B 2235/5268 (2013.01); C04B 2235/614 (2013.01); C04B 2235/616 (2013.01); Y10T 29/49316 (2015.01); Y10T 428/24124 (2015.01); Y10T 428/249921 (2015.04)

(58) Field of Classification Search
CPC ...................................... C04B 35/565
USPC ........................................... 428/102
See application file for complete search history.

(56) References Cited

U.S. PATENT DOCUMENTS

| 2007/0099527 A1* | 5/2007 | Brun | C04B 35/62868 442/185 |
|---|---|---|---|
| 2009/0239434 A1* | 9/2009 | Benitsch | C04B 35/83 442/179 |

FOREIGN PATENT DOCUMENTS

EP    2447305 A1    5/2012

OTHER PUBLICATIONS

International Search Report and Written Opinion, mailed May 12, 2014 for International Application No. PCT/US2013/075673, filed Dec. 17, 2013.

* cited by examiner

*Primary Examiner* — Brent O'Hern
(74) *Attorney, Agent, or Firm* — Brinks Gilson & Lione

(57) ABSTRACT

A novel ceramic matrix composite is disclosed for forming components that are operable in high temperature environments such those in gas turbine engines and the like. The ceramic matrix composite can include at least one layer of non-crimped fibers positioned substantially parallel to one another. A relatively small diameter elastic fiber can be constructed to stitch the non-crimped fibers together and a ceramic matrix may be deposited around the at least one layer of non-crimped fibers.

10 Claims, 6 Drawing Sheets

CERAMIC MATRIX COMPOSITE

FIELD OF THE INVENTION

The present disclosure relates to ceramic matrix composite fabrication and more particularly, to a ceramic matrix composite having improved material properties for fabricating components that are operational in gas turbine engines and the like.

BACKGROUND

Gas turbine engines operate at temperatures that are higher than the melting temperature of many of the metal components used in the hot areas such as the combustor and turbine sections. Large amounts of working fluid must be diverted from making power in the gas turbine engine to cooling metal components to keep the temperatures low enough that the integrity of the components are maintained in the hot operating environment. Ceramic based materials have been used for some of these components because of their low weight and higher temperature capability relative to metal based materials. Some components made of ceramic matrix composite material have drawbacks due to strength limitations, other shortcomings, and disadvantages relative to certain applications. Accordingly, there remains a need for further contributions in this area of technology.

SUMMARY

One embodiment of the present disclosure includes a unique ceramic matrix composite fabrication for high temperature applications. Another embodiment includes a gas turbine engine having a component made from the unique ceramic matrix fabrication. Other embodiments include unique apparatuses, systems, devices, hardware, methods, and combinations for an improved ceramic matrix composite construction. Further embodiments, forms, features, aspects, benefits, and advantages of the present application shall become apparent from the following description and drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
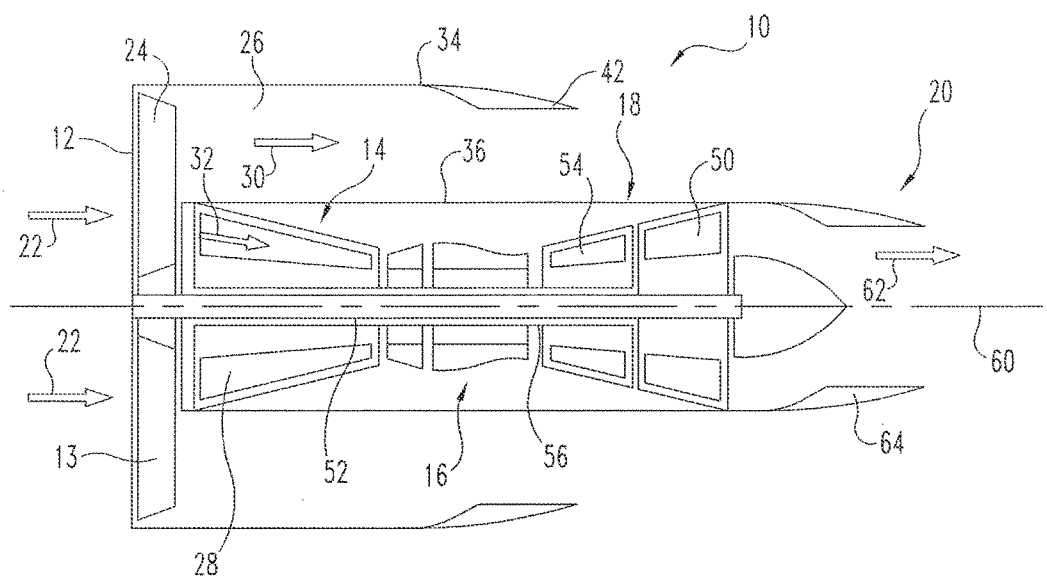
FIG. 1 is a schematic cross-sectional side view of a turbofan engine having components made from a ceramic matrix composite according to an embodiment of the present disclosure.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, a schematic view of a gas turbine engine configured as a turbofan engine 10 is depicted. While the turbofan engine 10 is illustrated in simplistic schematic form, it should be understood that the present disclosure including a component formed from a novel ceramic matrix composite is not limited to any particular engine design or configuration and as such may be used with any form of gas turbine engine such as turboprops, turbojets, unducted fan engines, and others having a range of complexities including multiple spools (multiple turbines operationally connected to multiple compressors), variable geometry turbomachinery, and in commercial or military applications. Further the novel ceramic matrix composite defined by the present disclosure can be used in other systems that operate in environments wherein high temperature capable components having a high strength to weight ratio is advantageous to operational capability.

The turbofan engine 10 will be described generally as one embodiment of the present disclosure, however significant details regarding gas turbine engine design and operation will not be presented herein as it is believed that the theory of operation and general parameters of gas turbine engines are well known to those of ordinary skill in the art. The turbofan engine 10 includes an inlet section 12, a fan section 13, a compressor section 14, a combustor section 16, a turbine section 18, and an exhaust section 20. In operation, air illustrated by arrows 22 is drawn in through the inlet 12 and passes through at least one fan stage 24 of the fan section 13 where the ambient air is compressed to a higher pressure. After passing through the fan section 13, the air can be split into a plurality of flowstreams. In this exemplary embodiment, the airflow is spilt into a bypass duct 26 and a core passageway 28. Airflow through the bypass duct 26 and the core passageway 28 is illustrated by arrows 30 and 32 respectively. The bypass duct 26 encompasses the core passageway 28 and can be defined by an outer circumferential wall 34 and an inner circumferential wall 36. The bypass duct 26 can also include a bypass nozzle 42 operable for creating a pressure differential across the fan 24 and for accelerating the bypass airflow 30 to provide bypass thrust for the turbofan engine 10.

The core airflow 32 enters the core passageway 28 after passing through the fan section 13. The core airflow is then further compressed in the compressor section 14 to a higher pressure relative to both ambient pressure and the air pressure in the bypass duct 26. The air is mixed with fuel in the combustor section 16 wherein the fuel/air mixture burns and produces a high temperature working fluid from which the turbine section 18 extracts power. The turbine section 18 can include low pressure turbine 50 mechanically coupled to the fan section 13 through a low pressure shaft 52 and a high pressure turbine 54 mechanically coupled to the compressor section 14 through a high pressure shaft 56. The shafts 52, 56 rotate about a centerline axis 60 that extends axially along the longitudinal axis of the engine 10, such that as the turbine section 18 rotates due to the forces generated by the high pressure working fluid, the fan section 13 and compressor section 14 section are rotatingly driven by the turbine section 18 to produce compressed air. After passing through the turbine section 18, the core exhaust flow represented by arrow 62 is accelerated to a high velocity through a core exhaust nozzle 64 to produce thrust for the turbofan engine 10.

Figure 2:
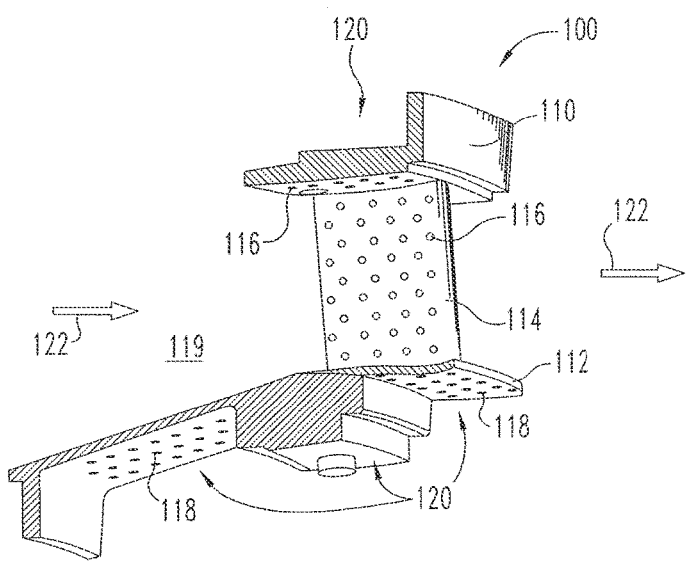
FIG. 2 is a perspective view of a representative ceramic matrix composite component in the form of a vane segment according to an embodiment of the present disclosure.

Referring now to FIG. 2, a vane segment 100 is illustrated as an exemplary component made from a ceramic matrix composite fabrication according to the present disclosure as will be described in detail below. The vane segment 100 can include an outer end wall 110 and an inner end wall 112 proximate a tip and a hub respectively of a vane 114. The end walls 110, 112 can be configured to operably connect with support structure (not shown) of the engine 10. A plurality of outlet cooling holes 116 can be formed along the outer surface of the vane 114 and the end walls 110, 112 to eject cooling fluid 120 from the vane segment 100 and into a hot fluid flowpath 119. The hot fluid flowpath 119 can be bounded by the outer vane end wall 110 and the inner vane end wall 112. High temperature fluid such as exhaust gas from a combustion section as illustrated by arrow 122 can flow through the hot fluid flowpath 119 and transfer heat into the vane segment 100. Cooling fluid 120, such as air or the like can be provided to the vane segment 100, by way of example and not limitation through an inlet aperture or a plurality of inlet cooling holes 118 formed in one or both of the end walls 110, 112.

Figure 3:
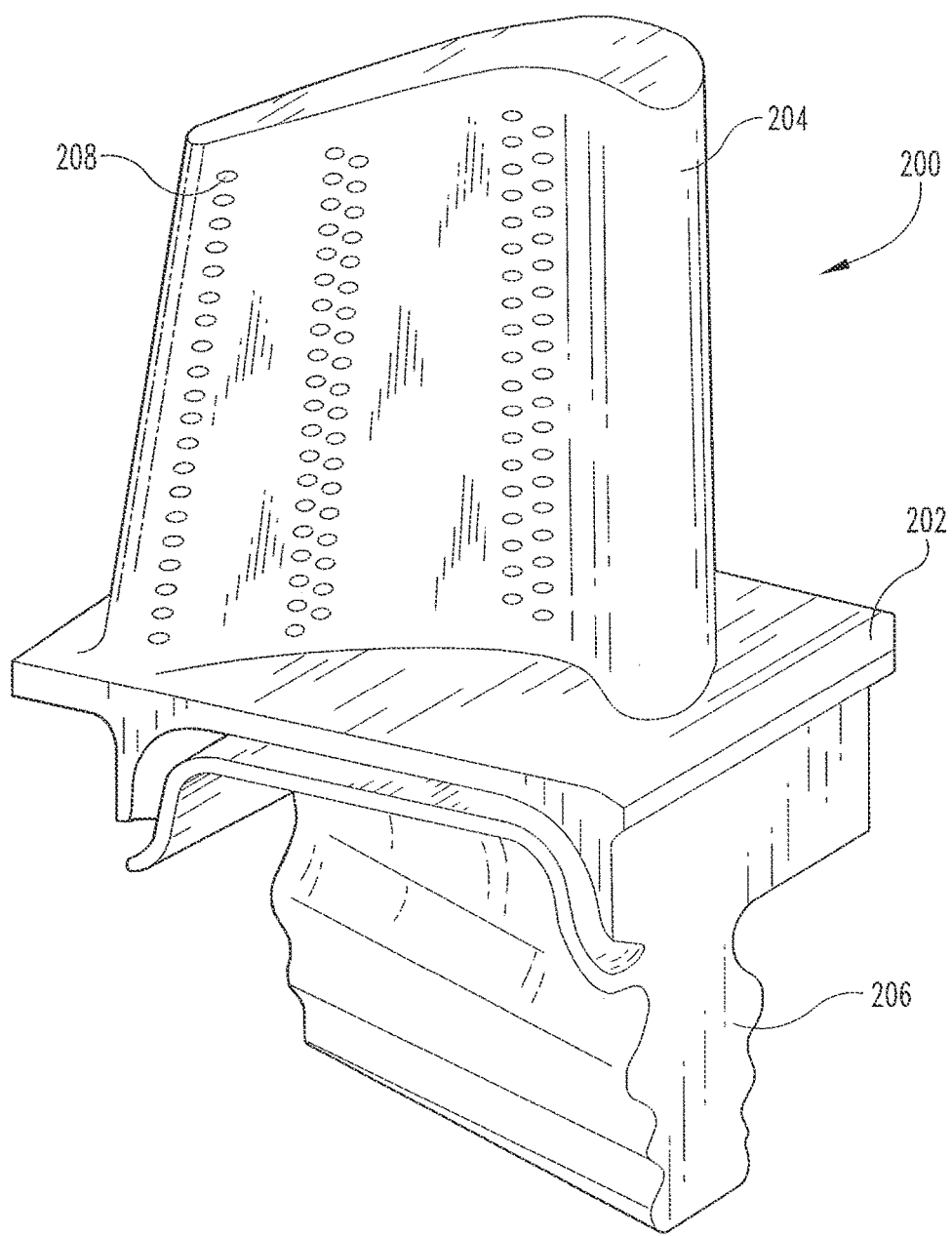
FIG. 3 is a perspective view of another representative ceramic matrix composite component in the form of a turbine blade according to an embodiment of the present disclosure.

Referring now to FIG. 3, a turbine blade is depicted as another exemplary component that may be made from a ceramic matrix composite material according to the present disclosure. The turbine blade 200 can include a platform 202 that may have an airfoil 204 extending radially outward therefrom. A root section 206 can include dovetail shaped connecting portion extending radially inward from the platform 202. The turbine blade 200 may also have other features such as cooling holes 208 and one or more layers of coatings such as a thermal barrier coating and/or an environmental barrier coating and the like.

Figure 4:
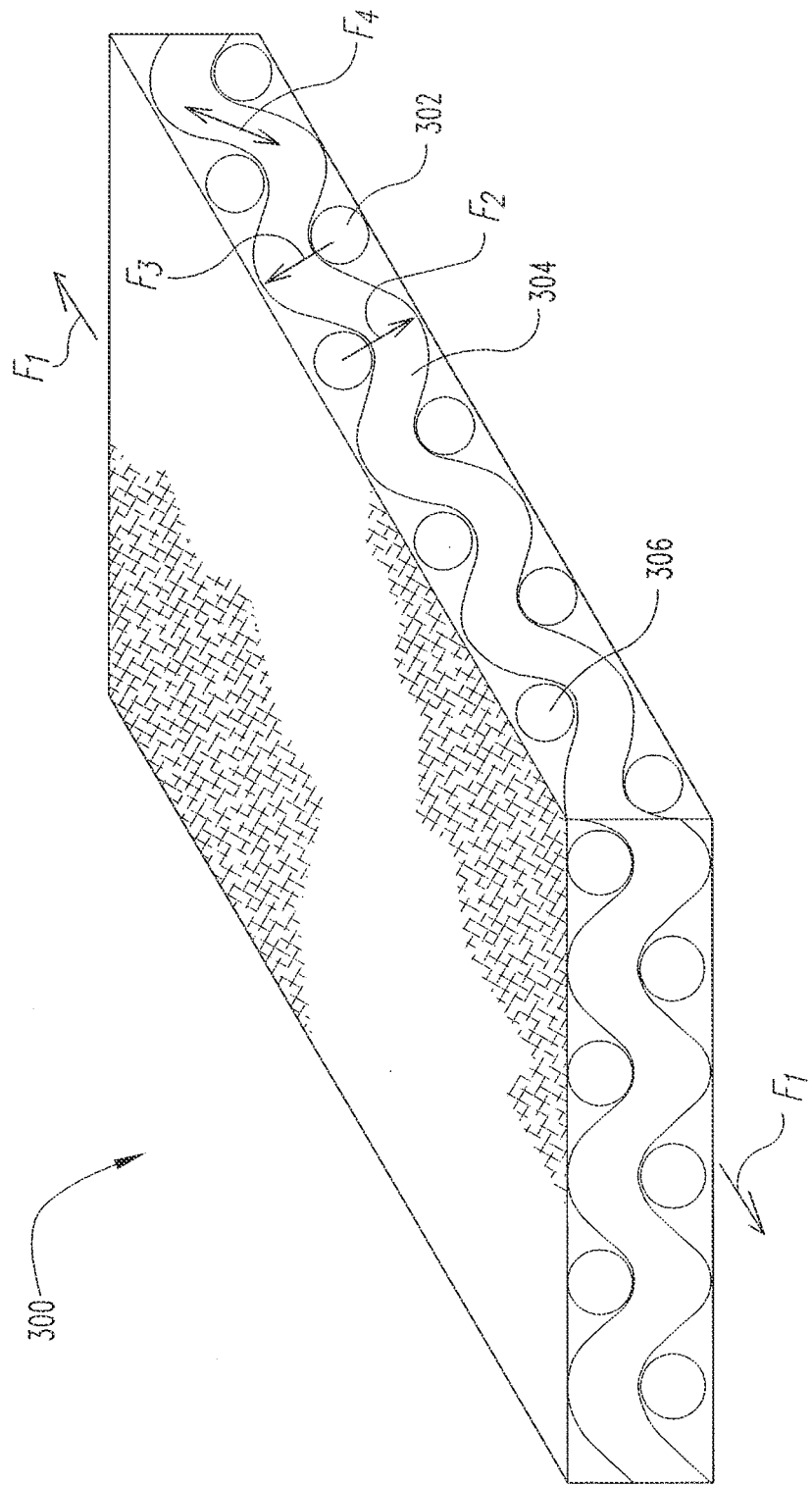
FIG. 4 is a schematic representation of a ceramic matrix composite layer having a crimped fiber weave according to a prior art configuration.

Prior art fiber layers woven into fabrics have crimped fibers such that the fibers are intertwined or alternating above and below adjacent fibers in a weave fashion as illustrated in FIG. 4. A multi-layer, crimped ceramic textile 300 includes a first layer of ceramic fibers 302, a second layer of ceramic fibers 304, and a third layer of ceramic fibers 306 formed in a weave pattern between adjacent fiber plies. As can be seen in FIG. 4, the prior art fibers are interweaved between layers in and out of a layer plane such that each fiber is bent or crimped as it traverses across another fiber in a weave pattern. Woven fibers such as those shown in FIG. 4 causes simple tension or compression forces acting along an axis to generate off axis loads or forces in the fibers. For example, a simple one dimensional tension force acting on the textile 300 represented by arrow F1 operates to generate forces in the fibers that include a more complex pattern due to the interaction between fibers. The force F1 generates nonlinear loading into fiber 304. A force represented by arrow F2 caused by a contact force with a fiber 306 above the fiber 304 is generally normal to the force vector F1. A force represented by arrow F3 caused by a contact force with a fiber 302 below the fiber 304 is generally normal to the force vector F1 and in opposite direction to that of the force F2. The fiber 304 will also load along the longitudinal direction thereof as illustrated by the double arrow labeled as F4. The crimp design illustrated in FIG. 4 results in an off axis loading and non-uniform load distribution within each fiber of a laminate layer. Fabrication and application of non-woven textiles in ceramic matrix composite applications can improve the tensile response of the material.

Figure 5:
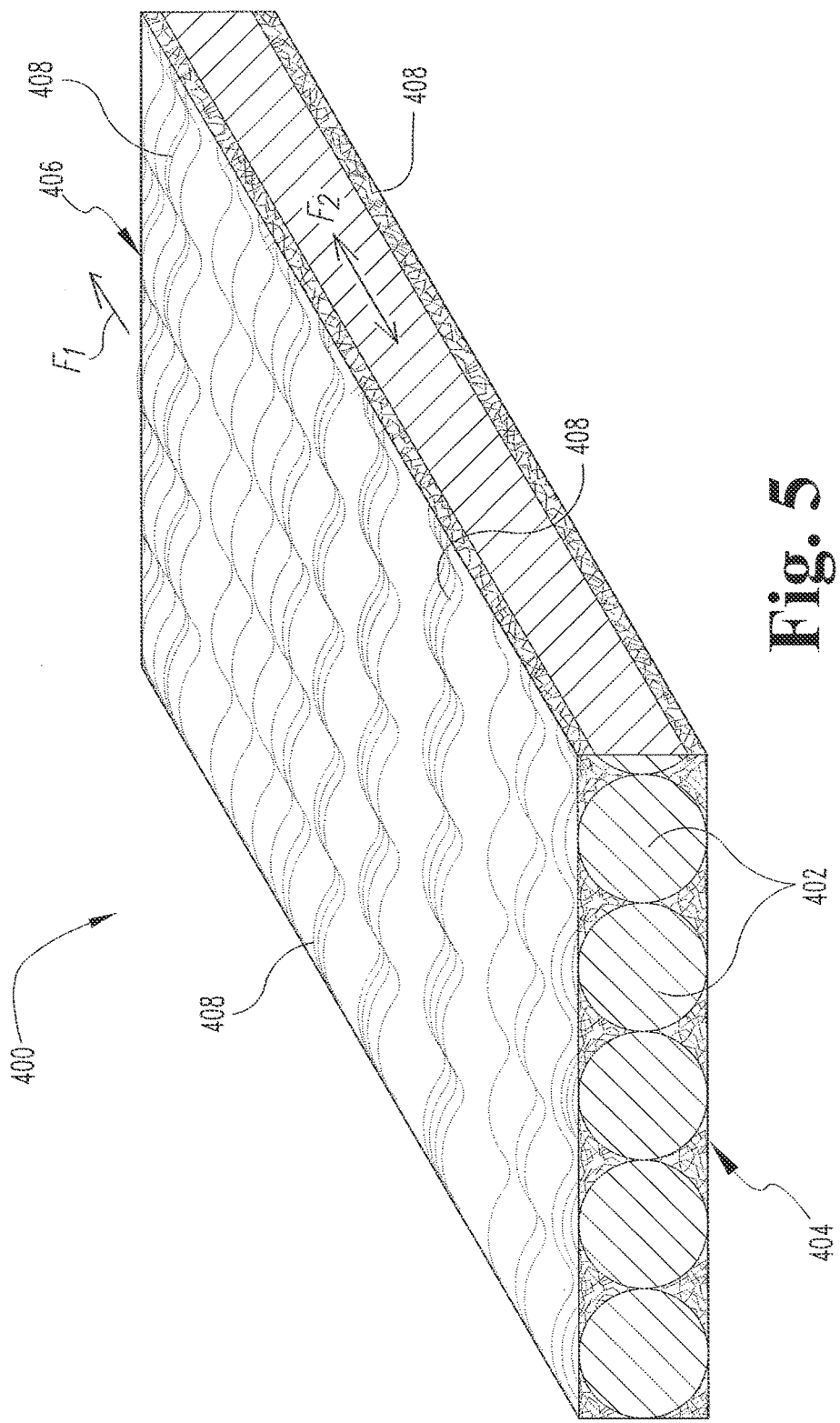
FIG. 5 is a schematic representation of a ceramic matrix composite layer having a non-crimped fiber pattern according to an embodiment of the present disclosure.

Referring now to FIG. 5, a schematic representation of a preform ply or layer 400 having a plurality of non-crimped fibers 402 is shown therein. Each of the plurality of non-crimped fibers 402 is positioned in substantially parallel orientation relative to one another. The non-crimped fibers 402 can extend from a first end 404 to a second end 406 of the preform layer 400 in a substantially longitudinal fashion. The non-crimped fibers 402 do not cross over or around one another along a longitudinal length of the fibers 402 between the first and second ends, 404, 406 respectively such that in plane reaction forces will act along a longitudinal length of the fibers 402. For example, a substantially planer force represented by a double arrow F1 acting in tension or compression on the preform layer 400 will cause a substantially longitudinal reaction force represented by a double arrow F2 in each of the non-crimped fibers 402 positioned in the layer 400 in the planer configuration. The non-crimped fibers 402 may be made from a number of materials including but not limited to ceramic material, organic material, metallic material, and/or glass material.

In order to hold the plurality of non-crimped fibers in a desired position relative to one another, small fiber 408 may be used to stitch the non-crimped fibers together. In one form the small fiber 408 may be used to stitch together the relatively larger non-crimped ceramic fibers 402. In another form, the small fiber may be made of an elastic polymer material and are configured or stitched in a manner as to provide a desired tow configuration as a portion of a preform structure.

The small fiber 408 can be bent at a sharp radius relative the diameter of the small fiber 408 and can also be stretched and twisted so as to hold the non-crimped fibers 402 in position to form a complex preform structure. As shown in FIG. 5, a diameter of the small fibers 408 may be less than a diameter of the non-crimped fibers 402.

The small fiber 408 may be made from a number of different materials including, but not limited to a polymer material such as polyvinylalcohol (PVA) that can be dissolved in water, an acrylic material that can be removed by heating in a vacuum with very little residual char, and/or a carbon material that can survive the processing to remain in the finished CMC component. Subsequent processing may or may not include removal of the small fiber 408 from the preform after laminating and prior to matrix infiltration of the preform.

The non-crimped fibers 402 can be made from a variety of materials including, but not limited to polymers, ceramics, inter-metallics, certain metals and/or mixtures thereof. Non-crimped ceramic fibers or plies can be made from, but are not limited to carbon, silicon carbides, alumina, and mullite.

The matrix may be formed from any number materials including, but not limited to polymers, metals, and ceramics and mixtures thereof. In one exemplary embodiment, a ceramic matrix may include silicon carbide and/or silicon/silicon carbide. The matrix can be combined with the non-crimped fiber preform via any operable process that allows the matrix material to be infiltrated into the porosity of the coated preform such as chemical vapor deposition or chemical vapor infiltration, pyrolysis, chemical reaction, sintering, and electrophoresis. In one example, the matrix material can be deposited by a slurry casting or slip casting process followed by melt infiltration. A slurry of carbon, carbon-containing resin, or other carbonaceous material, and optionally silicon carbide particulate is introduced into the preform porosity and molten silicon is thereafter infiltrated into the remaining space to react with the carbonaceous material to form silicon carbide. The amount of silicon may be stoichiometric, so that the matrix is silicon carbide. An excess of silicon may instead be used, so that the final structure is a mixture of reacted silicon carbide and unreacted silicon carbide.

Figure 6:
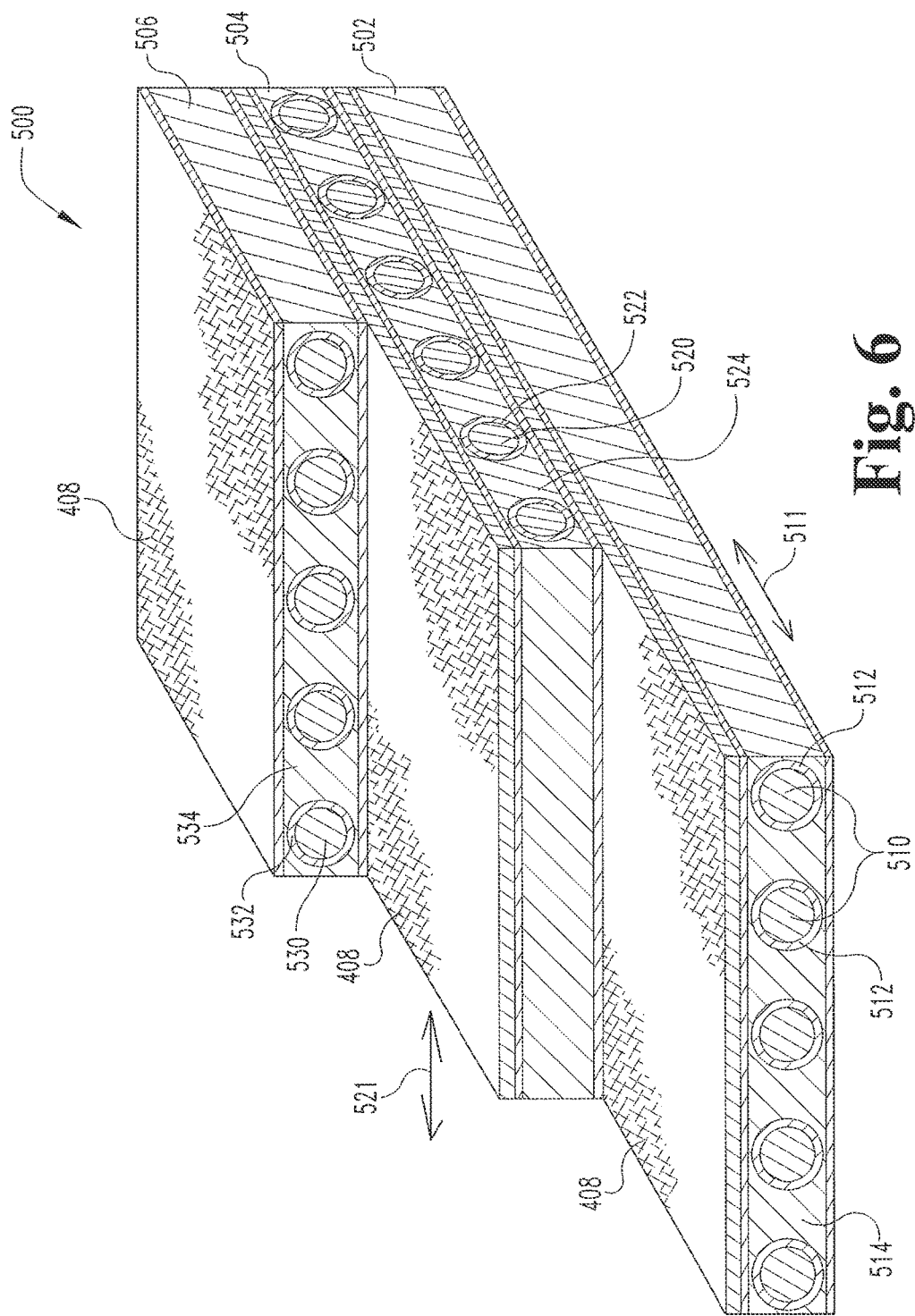
FIG. 6 is a schematic representation of a 3-ply ceramic matrix composite laminate having a non-crimped fiber pattern according to an embodiment of the present disclosure.

Referring now to FIG. 6, a multi-layer laminate 500 made of non-crimped ceramic fibers is shown therein. The multi-layer laminate 500 can include a plurality of layers such as the layer of fiber 400 shown in FIG. 5. The multi-layer laminate 500 includes a first layer 502, a second layer 504, and a third layer 506 in the illustrative embodiment. While three layers are shown in the exemplary embodiment, it should be understood that any number of layers may be used to provide structure for the preform prior to matrix infiltration.

The first layer 502 of the multi-layer laminate 500 includes a plurality of non-crimped fibers 510 positioned in one direction depicted by arrow 511. Each of the non-crimped fibers 510 can include a coating 512 applied around the outer surface thereof to provide desirable material properties such as friction reduction, strength enhancement or corrosion resistance to name but a few examples. A matrix material 514 can be deposited and/or infiltrated in and around each of the fibers 510 so as to form a laminate layer of ceramic matrix composite material.

The second layer 504 of the multi-layer laminate 500 can include a plurality of non-crimped fibers 520 positioned in a substantially orthogonal orientation represented by arrow 521 relative to the orientation of the fiber 510 of the first layer 502. The non-crimped fibers 520 of the second layer 502 can also include a coating 522 formed around the perimeter thereof in a similar manner to fibers 510 of the first layer 502. A matrix material 524 can be deposited and/or infiltrated in and around each of the fibers 520 so as to form a laminate layer of ceramic matrix composite material.

The third laminate layer 506 can include a plurality of non-crimped fibers 530 oriented in the same general direction as the fibers 510 in the first layer 502 of the multi-layer laminate 500. In this manner, each layer can include a fiber orientation that can alternate orthogonally 0-90 degrees relative to adjacent layers of the multi-layer laminate 500. The third layer 506 may also include a coating 532 formed around each of the non-crimped fibers 530 in similar fashion to the coatings in the first and second layers 502, 504, respectively. A matrix material 534 can be deposited and/or infiltrated in and around each of the fibers 530 so as to form a laminate layer of ceramic matrix composite material. While different numbers are used to point out the fibers, coatings and matrix of the various layers, it should be understood that the fibers, the coatings and the matrix can may be made from the same materials in each of the layers.

A plurality of small fibers 408 such as those made from an elastic polymer material can be used to stitch together the first, second and third layers, 502, 504, 506 respectively, to create a desired preform configuration. In some embodiments, the small fiber stitching 408 may be removed prior to infiltrating the preform with a ceramic matrix. In other embodiments the small fiber stitching such as small fiber formed from carbon may remain as part of the finished ceramic matrix composite component. A coating such as boron nitride coating can also be deposited on the non-crimped fibers prior to infiltration of a matrix material. The matrix material 514, 524, 534 can then be infiltrated in and around the non-crimped fibers in each of the layers 502, 504, and 506 to form the multi-layer ceramic matrix composite laminate 500 such that the strength of the ceramic matrix composite is maximized due to the uni-direction force loading on the non-crimped fibers.

Figure 7:
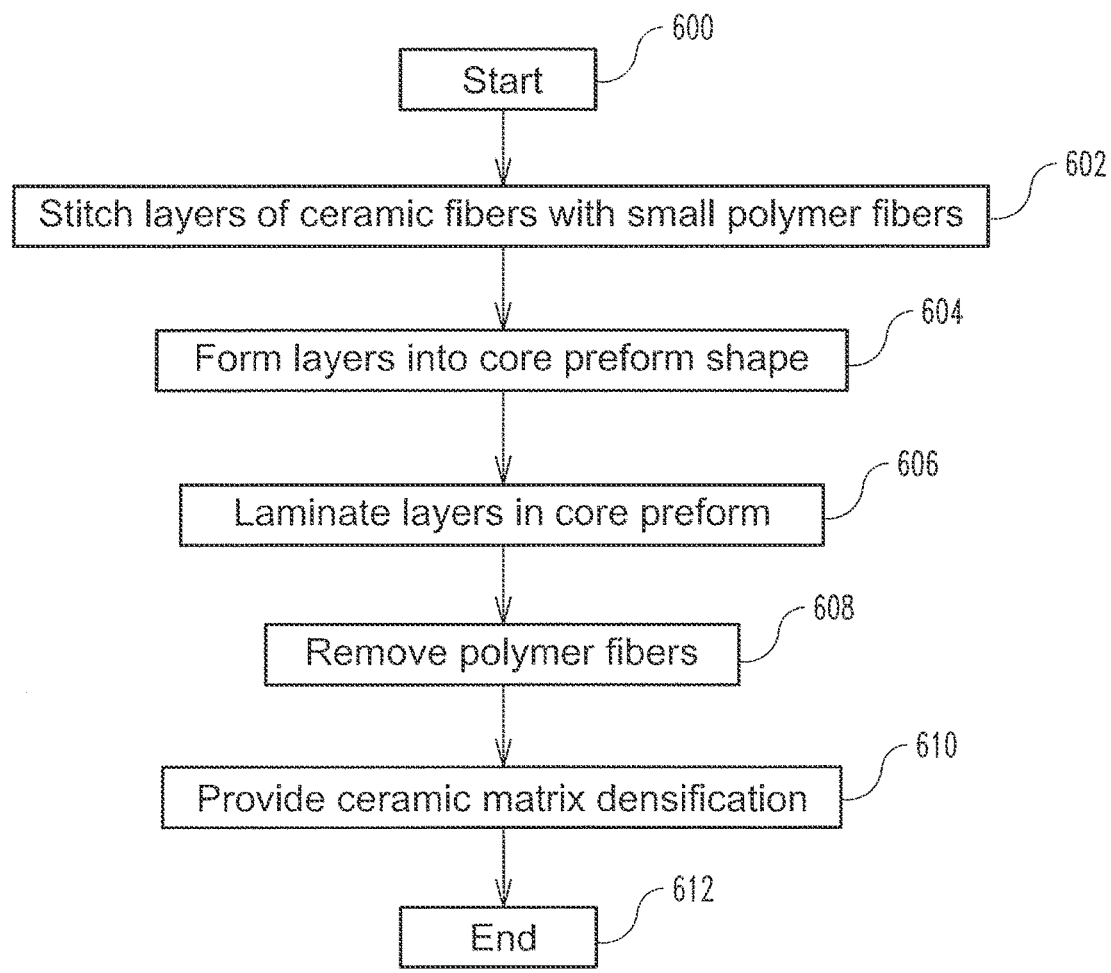
FIG. 7 is a flow chart illustrating a method of forming a component with ceramic matrix composite having a non-crimped fiber pattern according to an embodiment of the present disclosure.

Referring now to FIG. 7, a flowchart depicting an exemplary method for forming a ceramic matrix composite according to the present disclosure is illustrated. The exemplary method starts at step 600. At step 602, a plurality of non-crimped fibers are positioned in a desired orientation and stitched together with relatively small elastic fibers. In one exemplary embodiment, the non-crimped fibers can be made from a ceramic based material and the small elastic fibers can be made from a polymer material. At step 604, one or more layers of non-crimped ceramic fibers can be formed into a core preform shape. At step 606, the layers of non-crimped ceramic fibers can be coated as desired and laminated in a fixed position. At step 608, the small elastic polymer fibers can be removed from the core preform. Various methods for removing small elastic fiber are contemplated by the present disclosure. At step 610, the exemplary method includes a ceramic matrix densification process. After depositing ceramic matrix in and around the non-crimped fiber preform, various curing and finishing processes may be employed such as placing the CMC component in a temperature controlled and humidity controlled atmosphere, finish machining, and/or adding one or more coatings for thermal and/or environmental protection.

The present disclosure can be at least partially defined by a non-crimped fiber layout or orientation in each layer of ceramic matrix composite laminate. The small elastic fibers can be selected to enable simple removal after the ceramic perform is finalized. The elastic fiber removal process is designed to be tolerated by the ceramic fibers and does not result in leftover residual material that may adversely affect the ceramic fiber.

The response of the ceramic matrix composite with non-crimped fibers is different than that having woven fibers, because although the stiffness during loading will remain the same, the stress level where the matrix cracking begins will be delayed. This value is sometimes referred to as the proportional limit and is a critical property of a CMC component design. Prior art CMC design using crimped fiber formed fabrics causes complex inter-laminar tension loading in the ceramic matrix composite component and the nesting configuration is an important design element. In the case of a non-crimped fabric, the interaction of all the layers is more uniform and therefore the nesting design is not a critical factor. More consistent inter-laminar properties of the laminate layers having non-crimped fibers will support higher design stresses.

Another feature of the present disclosure is that the conformability of the fabric is enhanced because each unique directional layer of non-crimped fiber can be held together by relatively flexible polymer fibers. This is especially useful for ceramic fibers where shear and drapability are limited by the high stiffness of the fiber. The crimping of typical fabrics results in local variations of fiber consolidation when a laminate is squeezed to the desired fiber volume. The sections of a tow that are more compressed may result in fiber to fiber contact so that the interface coating cannot surround each fiber. This can lead to reduced strength because a fracture of the lowest strength fiber in a group of fibers that are not separated by an interface coating propagates to the higher strength fibers. Essentially, the weakest link results in multiple failures instead of only one. The local compression of fiber tows can limit the effectiveness of the matrix densification process. Densification processes such as chemical vapor infiltration (CVI), pre-ceramic polymer infiltration, pyrolysis, slurry and melt infiltration are affected when fibers are locally compressed together and limit the ability for the ceramic matrix material to infiltrate as necessary between the fibers. This leads to greater variation in the mechanical and thermal behavior of the material and effectively reduces the strength of the CMC component.

Traditional woven fabrics have varying levels of crimps in the tows depending on the weaving direction. In weave patterns, warp fibers are defined as the set of lengthwise fibers that are held in tension and weft fibers are defined as the fibers that are inserted over-and-under the warp fibers. The warp fibers that are in tension typically have less crimp than the weft fibers that are un-tensioned. In a prior art laminate of a 0/90 fabric, the variation in tension and untensioned fibers leads to variation of mechanical properties between the two fibers having a 0/90 orientation. With a non-crimped laminate of the present disclosure the difference in mechanical properties between 0/90 layers of fabric formed by parallel fiber is substantially eliminated, therefore the fabric can be more efficiently utilized because of the orientation of the textile is far less important than with the prior art textile. For ceramic fibers, weaving multi-layer textiles is more difficult because of the stiffness of the fiber which results in limitations on the minimum bend radius. Whereas, non-crimped textiles use highly elastic stitching material, therefore multi-layer constructions are more easily fabricated. This can translate into cost savings in production because fewer discrete layers need to be cut and assembled for a core preform.

In one form, the small elastic fibers used to hold the ceramic fibers together may be made of a polymer such as a polyvinyl alcohol (PVA). Small fibers made from PVA can be dissolved in water and therefore relatively easy to remove from the preform. In another form, the small elastic fiber may be an acrylic fiber that can be easily removed from the preform by heating the preform in a vacuum and pyrolyzing the small fibers. Pyrolyzing the acrylic fibers leaves only a very small residual char and does not degrade the ceramic fibers or ceramic matrix. In another example, the small fibers can also be a carbon fiber that survives subsequent ceramic processing, but does not degrade the CMC performance. The small elastic fibers may be woven around a primary reinforcement or alternatively may be a polymer that holds the fibers together like a pre-impregnated textile for creating polymer matrix composites. It should be understood that there are no limitations for the material selection for the small elastic fiber binding material, other than the material must be compatible with the ceramic matrix composite and be able to hold the ceramic fibers in a desired core preform shape during the CMC fabrication process.

A non-crimped fabric may be composed of one or more layers. In some embodiments, each layer may have a different fiber orientation relative to an adjacent layer, alternatively in other embodiments, adjacent layers may have the same fiber orientation. The fiber tows, which can be defined as an untwisted bundle of continuous fibers, may be spread prior to stitching to reduce the layer thickness in a particular direction or to make use of a bundle with a larger fiber count. In one non-limiting example, the non-crimped textiles may also be use bundles or individual monofilaments with a diameter from 20 to 300 microns like SCS ultra silicon carbon manufactured by Specialty Products. In another non-limiting example pitch monofilament or boron monofilament may be used with the non-crimped textiles. Because these filaments have relatively large cross sections they cannot be woven like a traditional textile, but can be advantageously utilized in a non-crimped CMC tow.

The increase in microstructural uniformity of the non-crimped fiber layers will lead to more consistent material behavior and better mechanical and thermal properties for a component design due to the reduced variation of the non-crimped design. The increased uniformity of the microstructure may support an increase in densification rate that can reduce the cost of fabricating the ceramic matrix composite.

The non-crimped fiber design also provides additional options for biasing of the fiber direction. For example, a non-crimped fabric can be constructed with three layers so that the outer two are in the same direction and the center is in a perpendicular direction. In other embodiments, different relative fiber orientations can be used such as 0-90-45 (0 degrees-90 degrees-45 degrees). In other examples any relative fiber orientation may be fabricated as desired.

Prior art methods of fabrication using a weave can increase fiber volume in a particular direction because of the overlapping of the crimped fabrics. This can cause a degradation of material properties or a tradeoff in final dimensional configuration due to the non-uniformity of the weave layers. The methods of biasing in typical fabric constructions will result in greater non-uniformity of the microstructure, therefore using non-crimped fiber layers has a distinct advantage. The fiber volume of the composite for traditional textiles will reach a limit much earlier due to the inefficient spacing of the fiber bundles and gaps in the compressed structure. Further the non-crimped laminate layers increased proportional strength because the fibers are not positioned off axis and carry loads in a substantially longitudinal direction. Increased formability of the fabric due to the reduced interaction of the layers is provided by using the elastic stitching material and pattern whereas the limits of prior art fabrics construction are fixed by the fabric type, weave style and spacing of the individual tows.

Another improved property of the non-crimped fiber pattern is that there is additional freedom of fibers to shift relative to one another which enables a creation of simple bends and cross sections using relatively thick non-woven materials. This is helpful when the stitching design is optimized for the preform construction and results in a uniform cross section with simpler construction techniques. Further, an improved surface finish can result from utilizing non-crimped fiber layers in a ceramic matrix composite because it results in flatter or smoother external surfaces relative to the prior art construction using a weave design.

In one exemplary embodiment, a CMC structure can include a C-shaped cross section. A ten layer non-woven textile can be fabricated with 35% fiber volume and stitched in place with small elastic fiber. Six layers can be oriented in a 0 direction while the other four layers can be oriented in the 90° direction. The preform can be shaped by forming it over a male tool as desired. The preform can then be captured by a mating tool to fully enclose the inner and outer surfaces of the C-shaped cross section. The preform and tools can be heated in an oven at, for example 600° C. to remove the small stitching. The preform and tool can be placed in a vacuum furnace and the fibers can be coated with boron nitride via chemical vapor infiltration (CVI). The preform can then be additionally infiltrated with a silicon carbide (SiC) by CVI. The preform densification is completed by a silicon carbide slurry/silicon melt (SiC slurry/Si) infiltration process. The CMC component can then be finish machined and coated with an environmental barrier coating and/or a thermal barrier coating and the like. The improved microstructure will reduce manufacturing costs for the preforming operation and will result in life cycle cost benefits to the CMC component.

In another example, a hollow airfoil shaped vane can be constructed from a SiC/SiC (silicon carbide fiber/silicon carbide matrix) ceramic matrix composite for a gas turbine engine or the like. A C-shaped preform can be constructed using non-woven textiles including an inner layer of fiber oriented in a 0 direction and opposing outer layers on each side of the inner layer formed in a 90° direction relative to the 0 direction. A vane inner mandrel can be wrapped so that the 90° direction of the textile is oriented chord-wise relative to the airfoil shaped vane to be formed. This orientation process produces an increased strength and stiffness in the chord-wise direction. At least three layers of the same textile can be employed in a construction of this preform. The preform can then be captured by a mating tool to fully enclose the inner and outer surfaces of the C-shaped preform. The C-shaped preform along with the tools can then be heated in an oven at approximately 600° C. to remove the small elastic stitching. The preform and tools can then be placed in a vacuum furnace to provide a boron nitride fiber coating to the fibers via CVI. The part can then be additionally infiltrated by a SiC material through CVI. Ceramic composite densification can then be completed with a SiC slurry/Si melt infiltration process. The component can then be machined and coated with an environmental barrier coating and/or thermal barrier and the like. The improved microstructure and increased strength in the primary load direction results in increased design margin and life improvements for the component.

In yet another non-limiting example, a CMC solid turbine blade preform can be fabricated according to the teachings of the present disclosure. The blade preform can be fabricated using a Hi-NICALON™ S non-crimped textile. Hi-NICALON™ ceramic fiber is a multi-filament silicon carbide-type fiber manufactured by Nippon Carbon Co., Ltd. (NCK) of Japan. The textile can be bound together with small PVA thread. The textile can then be constructed with a spread Hi-NICALON™ S tow in the chord-wise direction. SCS silicon carbide fibers made be Specialty Materials Inc, including an SCS Ultra Fiber can be mixed into the Hi-NICALON™ S tow at a 2:1 ratio by mass in the span wise direction. The overall fiber ratio of the span:chord ratio can be approximately 3:1. The textile can be limited to two layers so as to permit fine or small detailed features to be formed therein. The layers can be cut and laminated with a tool to create a desired shape of the preform. The preform can then be captured with perforated high temperature tooling. The preform and tool can be soaked in water at 90° C. for approximately two hours to remove the small PVA stitching. This cycle can be repeated if necessary. The preform and the tool can then be dried in an oven at 150° C. as necessary which can take up to four hours or more. The preform and tool can then be placed in a vacuum furnace for boron nitride fiber coating via CVI. The component is then additionally infiltrated by SiC by CVI. Part densification can be completed by a SiC slurry/Si melt infiltration process to form the ceramic matrix. The part can then be finished machined and coated as desired with an environmental barrier coating and/or a thermal barrier coating and the like. The textile used to form the exemplary turbine blade results in material properties having high strength and creep resistance such that the turbine blade can be used in gas turbine engines that operate at high speeds and high temperatures.

In one aspect, the present disclosure includes a ceramic matrix composite comprising at least one layer of non-crimped fibers positioned substantially parallel to one another; a relatively small diameter elastic fiber can be constructed to stitch the non-crimped fibers together, and a ceramic matrix deposited around the at least one layer of non-crimped fibers. The small elastic fiber can be made from one of a polymer material, acrylic material and a ceramic material. In one form, the small elastic fiber can be removed from the non-crimped fibers prior to depositing the ceramic matrix. The small elastic fiber removal can be implemented by exposure to a liquid, exposure to a gas or exposure to heat in a vacuum.

In another aspect, the present disclosure includes a gas turbine engine comprising a compression section; a combustor section positioned downstream of the compression section; a turbine section positioned downstream of the combustor section; an exhaust section positioned downstream of the turbine section; and a component positioned in one of the sections. The component can be formed from a plurality of layers of non-crimped fibers, wherein each layer includes a plurality of non-crimped fibers positioned substantially parallel to one another. A relatively small diameter fiber can be constructed to stitch the layers of non-crimped fibers together to form a preform core shape; and a ceramic matrix can infiltrated into the preform core shape via CVI to form a non-finished CMC component. The small fiber can be made from one of a polymer material, acrylic material and a carbon material and in some embodiments may be removed from the preform prior to depositing the ceramic matrix. Each of the layers of non-crimped fibers may have the same fiber orientation or different fiber orientation relative adjacent layers.

In another aspect, the present disclosure includes a method for stitching plies of relatively large diameter non-crimped fibers together with relative small diameter fiber, forming the plies of non-crimped fibers into a core preform shape; and infiltrating the core preform with a ceramic matrix to form a non-finished ceramic matrix composite component. The method can further include coating the non-crimped fibers prior to the infiltrating with a material at least partially made from boron nitride. The method can further include removing the small fiber from the preform prior to the infiltrating by exposing the small fiber to at least one of a liquid, a gas or heat in a vacuum. The CMC component can post processed to make a finished component that is operable in a gas turbine engine.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and embodiment lacking the same may be contemplated as within the scope of the invention, that scope being defined by the claims that follow. In reading the claims it is intended that the words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A ceramic matrix composite comprising:
   at least one layer of non-crimped fibers positioned substantially parallel to one another;
   an elastic fiber bent around the non-crimped fibers to stitch the non-crimped fibers together, wherein a diameter of the elastic fiber is less than a diameter of the non-crimped fibers; and
   a ceramic matrix deposited around the at least one layer of non-crimped fibers.

2. The ceramic matrix composite of claim 1, wherein the elastic fiber is made from one of a polymer material, acrylic material and a carbon material.

3. The ceramic matrix composite of claim 1, wherein the elastic fiber is configured to be at least one of dissolvable or removable by heating from the non-crimped fibers prior to depositing the ceramic matrix.

4. The ceramic matrix composite of claim 1, wherein the elastic fiber is configured to be at least one of dissolvable or removable by heating by at least one of exposure to a liquid, exposure to a gas or exposure to heat in a vacuum.

5. The ceramic matrix composite of claim 1, wherein the non-crimped fibers comprise a monofilament having a cross sectional diameter between approximately 20 and 300 microns.

6. The ceramic matrix composite of claim 1, further comprising:
   a plurality of layers of non-crimped fibers configured into a preform core with a desired shape.

7. The ceramic matrix composite of claim 6, wherein the plurality of layers are held in place with the elastic fiber.

8. The ceramic matrix composite of claim 6, wherein at least one layer includes a non-crimped fiber orientation that is different from a non-crimped fiber orientation of an adjacent layer.

9. The ceramic matrix composite of claim 1 wherein the non-crimped fibers are formed from one of silicon, silicon carbide, or carbon material.

10. The ceramic matrix composite of claim 1, wherein a finished component made from the ceramic matrix composite is operable in a gas turbine engine.

* * * * *